(12) United States Patent
Nelson et al.

(10) Patent No.: US 12,249,212 B2
(45) Date of Patent: *Mar. 11, 2025

(54) SELECTIVELY PROVIDING LIVE SPORTING EVENT VIDEO AT SPORTS GAMING DEVICES, AND RELATED SYSTEMS AND METHODS

(71) Applicant: IGT, Las Vegas, NV (US)

(72) Inventors: Dwayne Nelson, Las Vegas, NV (US); Steve Lemay, Reno, NV (US); John Hurley, Reno, NV (US); Thang Doan, Sparks, NV (US); Chun Jia, Sparks, NV (US)

(73) Assignee: IGT, Las Vegas, NV (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/560,678

(22) Filed: Dec. 23, 2021

(65) Prior Publication Data

US 2022/0114865 A1 Apr. 14, 2022

Related U.S. Application Data

(63) Continuation of application No. 16/520,870, filed on Jul. 24, 2019, now Pat. No. 11,210,896.

(51) Int. Cl.
*A63F 9/24* (2006.01)
*G06Q 50/34* (2012.01)
(Continued)

(52) U.S. Cl.
CPC ......... *G07F 17/3241* (2013.01); *G06Q 50/34* (2013.01); *G07F 17/3211* (2013.01);
(Continued)

(58) Field of Classification Search
None
See application file for complete search history.

(56) References Cited

U.S. PATENT DOCUMENTS 8,821,274 B2 9/2014 Lyons et al.
9,269,222 B2 2/2016 Froy et al.
(Continued)

*Primary Examiner* — Lawrence S Galka
(74) *Attorney, Agent, or Firm* — Sage Patent Group

(57) ABSTRACT

Devices, systems and methods for selectively providing live sporting event video at sports gaming devices may include decrypting a first encrypted video signal is decrypted into a first decrypted video signal that includes a first encoded video stream of a first live sporting event. The first encoded video stream may be decoded into a first decoded video stream that includes a first video of the first live sporting event, which may be displayed by a display device along with first wager information to facilitate a user placing a wager on the first live sporting event. In response to receiving an instruction to display a second video of a second live sporting event, a second encrypted video signal may be decrypted into a second decrypted video signal that includes a second encoded video stream of the second live sporting event. The second encoded video stream may be decoded into a second decoded video stream that includes the second video of the second live sporting event. The display device may then display the second video of the second live sporting event, along with second wager information to facilitate a user placing a wager on the second live sporting event.

17 Claims, 10 Drawing Sheets

(51) Int. Cl.
*G07F 17/32* (2006.01)
*H04N 19/44* (2014.01)
*H04N 19/70* (2014.01)

(52) U.S. Cl.
CPC ...... *G07F 17/3223* (2013.01); *G07F 17/3288* (2013.01); *H04N 19/44* (2014.11); *H04N 19/70* (2014.11)

(56) References Cited

U.S. PATENT DOCUMENTS

| | | | |
|---|---|---|---|
| 2002/0069419 A1* | 6/2002 | Raverdy | H04L 67/306 348/E7.071 |
| 2003/0119576 A1 | 6/2003 | McClintic et al. | |
| 2006/0095939 A1* | 5/2006 | Jutzi | H04N 21/6112 725/74 |
| 2007/0087804 A1* | 4/2007 | Knowles | G07F 17/3288 463/43 |
| 2008/0311971 A1 | 12/2008 | Dean | |
| 2011/0275432 A1* | 11/2011 | Lutnick | G07F 17/3241 463/25 |
| 2013/0059650 A1 | 3/2013 | Sylla et al. | |
| 2016/0035187 A1* | 2/2016 | Swanson | G07F 17/3244 463/25 |

\* cited by examiner

700  FIG. 7A

RECEIVING, BY THE PROCESSOR CIRCUIT, A SECOND ENCRYPTED VIDEO SIGNAL
714

DECRYPTING, BY THE PROCESSOR CIRCUIT, THE SECOND ENCRYPTED VIDEO SIGNAL INTO A SECOND DECRYPTED VIDEO SIGNAL COMPRISING A SECOND ENCODED VIDEO STREAM OF THE SECOND LIVE SPORTING EVENT
716

DECODING, BY THE PROCESSOR CIRCUIT, THE SECOND ENCODED VIDEO STREAM INTO A SECOND DECODED VIDEO STREAM OF THE SECOND LIVE SPORTING EVENT, WHEREIN THE SECOND DECODED VIDEO STREAM COMPRISES THE SECOND VIDEO OF THE SECOND LIVE SPORTING EVENT
718

CAUSING, BY THE PROCESSOR CIRCUIT, THE DISPLAY DEVICE TO DISPLAY THE SECOND VIDEO OF THE SECOND LIVE SPORTING EVENT
720

CAUSING, BY THE PROCESSOR CIRCUIT, THE DISPLAY DEVICE TO DISPLAY SECOND WAGER INFORMATION TO FACILITATE A USER PLACING A WAGER ON THE SECOND LIVE SPORTING EVENT
722

CAUSING THE DISPLAY DEVICE TO SUSPEND DISPLAYING THE FIRST VIDEO OF THE FIRST LIVE SPORTING EVENT
724

*FIG. 7B*

SELECTIVELY PROVIDING LIVE SPORTING EVENT VIDEO AT SPORTS GAMING DEVICES, AND RELATED SYSTEMS AND METHODS

CROSS REFERENCE TO RELATED APPLICATIONS

The present application is a continuation of U.S. patent application Ser. No. 16/520,870, filed Jul. 24, 2019, entitled, "SELECTIVELY PROVIDING LIVE SPORTING EVENT VIDEO AT SPORTS GAMING DEVICES, AND RELATED SYSTEMS AND METHODS," the disclosure and content of which is incorporated herein in its entirety as set forth herein.

BACKGROUND

Embodiments described herein relate to providing video at gaming devices, and in particular to selectively providing live sporting event video at sports gaming devices, and related systems and methods. Live sporting events have many aspects that make them attractive to spectators, both from an entertainment standpoint and a wagering and/or betting standpoint. Live sporting events may be viewed in person, e.g., in a sports venue such as ballpark or stadium, or remotely, e.g., in a casino or other gaming environment, via a television or other video display. As technology improves and as the competition for the attention of bettors and spectators increases, there is a need for additional interactive features that increase spectator involvement and excitement.

SUMMARY

According to an embodiment, a gaming system includes a processor circuit and a memory coupled to the processor circuit. The memory includes machine-readable instructions that, when executed by the processor circuit, cause the processor circuit to receive an encrypted video signal and decrypt the encrypted video signal into a decrypted video signal including a first encoded video stream of a first live sporting event and a second encoded video stream of a second live sporting event. The machine-readable instructions further cause the processor circuit to decode the first encoded video stream into a first decoded video stream of the first live sporting event, wherein the first decoded video stream includes a first video of the first live sporting event. The machine-readable instructions further cause the processor circuit to cause a display device of an electronic gaming device to display the first video of the first live sporting event and display first wager information to facilitate a user placing a wager on the first live sporting event. The machine-readable instructions further cause the processor circuit to receive an instruction to display a second video of the second live sporting event and, in response to receiving the instruction to display the second video of the second live sporting event, decode the second encoded video stream into second decoded video stream of the second live sporting event, wherein the second decoded video stream includes the second video of the second live sporting event. The machine-readable instructions further cause the processor circuit to, in response to receiving the instruction to display the second video of the second live sporting event, cause the display device to display the second video of the second live sporting event; and display second wager information to facilitate a user placing a wager on the second live sporting event.

According to another embodiment, a method includes receiving, by a processor circuit, a first encrypted video signal and decrypting, by the processor circuit, the first encrypted video signal into a first decrypted video signal including a first encoded video stream of a first live sporting event. The method further includes decoding, by the processor circuit, the first encoded video stream into a first decoded video stream of the first live sporting event, wherein the first decoded video stream including a first video of the first live sporting event. The method further includes causing, by the processor circuit, a display device of an electronic gaming device to display the first video of the first live sporting event and display first wager information to facilitate a user placing a wager on the first live sporting event. The method further includes receiving by the processor circuit, an instruction to display a second video of a second live sporting event. The method further includes receiving, by the processor circuit, a second encrypted video signal, and decrypting, by the processor circuit, the second encrypted video signal into a second decrypted video signal including a second encoded video stream of the second live sporting event. The method further includes, in response to receiving the instruction to display the second video of the second live sporting event, decoding, by the processor circuit, the second encoded video stream into a second decoded video stream of the second live sporting event, wherein the second decoded video stream includes the second video of the second live sporting event. The method further includes, in response to receiving the instruction to display the second video of the second live sporting event, causing, by the processor circuit, the display device to display the second video of the second live sporting event, and display second wager information to facilitate a user placing a wager on the second live sporting event.

According to another embodiment, a gaming device includes a display device, an input device, a processor circuit, and a memory coupled to the processor circuit. The memory includes machine-readable instructions that, when executed by the processor circuit, cause the processor circuit to receive an encrypted video signal from a source device, the encrypted video signal including a first video of a first live sporting event and a second video of a second live sporting event. The machine-readable instructions further cause the processor circuit to cause the display device to display the first video of the first live sporting event, and display first wager information to facilitate a user placing a wager on the first live sporting event. The machine-readable instructions further cause the processor circuit to receive a user input via the input device indicative of an instruction to display the second video of the second live sporting event. The machine-readable instructions further cause the processor circuit to, in response to receiving the user input, cause the display device to display the second video of the second live sporting event. The machine-readable instructions further cause the processor circuit to, in response to receiving the user input, cause the display device to display second wager information to facilitate a user placing a wager on the second live sporting event.

BRIEF DESCRIPTION OF THE DRAWINGS

FIGS. 7A and 7B are flowcharts illustrating operations of systems/methods according to some embodiments.

DETAILED DESCRIPTION

Embodiments described herein relate to providing video at gaming devices, and in particular to selectively providing live sporting event video at sports gaming devices, and related systems and methods. In some embodiments, a first encrypted video signal is decrypted into a first decrypted video signal that includes a first encoded video stream of a first live sporting event. The first encoded video stream is decoded into a first decoded video stream that includes a first video of the first live sporting event, which is displayed by a display device along with first wager information to facilitate a user placing a wager on the first live sporting event. In response to receiving an instruction to display a second video of a second live sporting event, a second encrypted video signal is decrypted into a second decrypted video signal that includes a second encoded video stream of the second live sporting event. The second encoded video stream is decoded into a second decoded video stream that includes the second video of the second live sporting event. The display device then displays the second video of the second live sporting event, along with second wager information to facilitate a user placing a wager on the second live sporting event.

Advantages of these and other embodiments include the ability to selectively switch between video of live sporting events in a casino setting, to facilitate users individually selecting specific live sporting events and placing wagers on different live sporting events. These and other embodiments provide a unique technical solution to the technical problem of providing individualized viewing experiences for user in a casino or other sports gambling setting.

Figure 1:
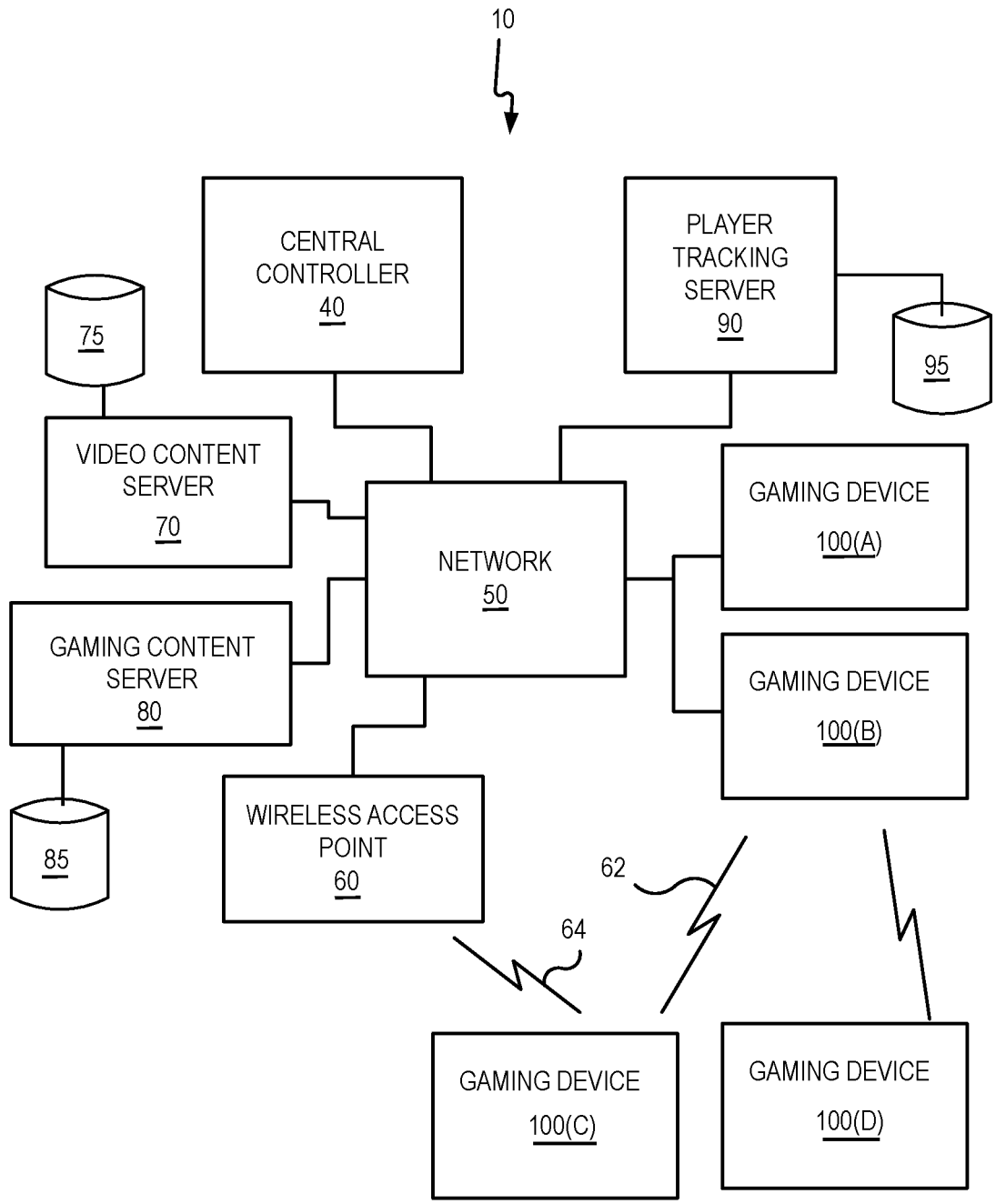
FIG. 1 is a schematic block diagram illustrating a network configuration for a plurality of gaming devices according to some embodiments.

In this regard, FIG. 1 illustrates a system 10 including a plurality of gaming devices 100. The system 10 may be located, for example, on the premises of a gaming establishment, such as a casino, in a private residence, or may include components that are located at different locations. The gaming devices 100 may be in communication with each other and/or a central controller 40 through a data communication network 50, or remote communication link.

The data communication network 50 may be a private data communication network that is operated, for example, by the gaming facility that operates the gaming device 100, a publicly accessible data communication network such as the Internet, or a combination thereof. Communications over the data communication network 50 may be encrypted for security. The central controller 40 may be any suitable server or computing device which includes at least one processing circuit, such as a processor, and at least one memory or storage device. Each gaming device 100 may include a processing circuit that transmits and receives events, messages, commands or any other suitable data or signal between the gaming device 100 and the central controller 40 and/or other gaming devices 100. The gaming device processor is operable to execute such communicated events, messages or commands in conjunction with the operation of the gaming device 100. Moreover, the processor of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processors. Moreover, in some embodiments, one or more of the functions of one or more gaming device processors as disclosed herein may be performed by the central controller 40.

A wireless access point 60 provides wireless access to the data communication network 50. The wireless access point 60 may be connected to the data communication network 50 as illustrated in FIG. 1, or may be connected directly to the central controller 40 or another server connected to the data communication network 50.

One or more content servers, such as a video content server 70 and a gaming content server 80, may also be connected through the data communication network 50. The video content server 70 may manage delivery of the streaming video content to a user of a gaming device 100. The streaming video content may be received in real-time or near-real-time from an external source, and/or stored in a video content database 75 for later retrieval and distribution by the video content server 70. Similarly, the gaming content server 80 may manage delivery of the gaming content to the user of a gaming device 100. The gaming content may be stored in a gaming content database 85. The video content server 70 and a gaming content server 80 may be implemented within or separately from each other. The video content server 70 and a gaming content server 80 may also be implemented within or separately from the central controller 40.

A player tracking server 90 may also be connected through the data communication network 50. The player tracking server 90 may manage a player tracking account that tracks the gameplay and spending and/or other player preferences and customizations of a player, e.g., the user of the gaming device 100, manages loyalty awards for the player, manages funds deposited or advanced on behalf of the player, and other functions. Player information managed by the player tracking server 90 may be stored in a player information database 95.

The gaming devices 100 communicate with one or more elements of the system 10 to coordinate providing streaming video content and synchronized gaming content. For example, in some embodiments, a gaming device 100 may communicate directly with another gaming device 100 over a wireless interface 62, which may be a WiFi link, a Bluetooth link, an NFC link, etc. In other embodiments, the gaming device 100 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the gaming device 100 may communicate with other gaming devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100 and/or central controller 40 to coordinate providing streaming video content and synchronized gaming content to the gaming devices 100.

In some embodiments, the central controller 40, video content server 70 and/or gaming content server 80 may coordinate the generation and display of the streaming video content and the synchronized gaming content to more than one user and/or to more than one gaming device 100. As described in more detail below, this may enable multiple users to interact with the same streaming video content and/or gaming content in real time. This feature can be used to provide a shared multiplayer experience to multiple users at the same time. Moreover, in some embodiments, the central controller 40, video content server 70 and/or gaming content server 80 may coordinate the generation and display of the streaming video content and the synchronized gaming content to users at different physical locations.

Figure 2:
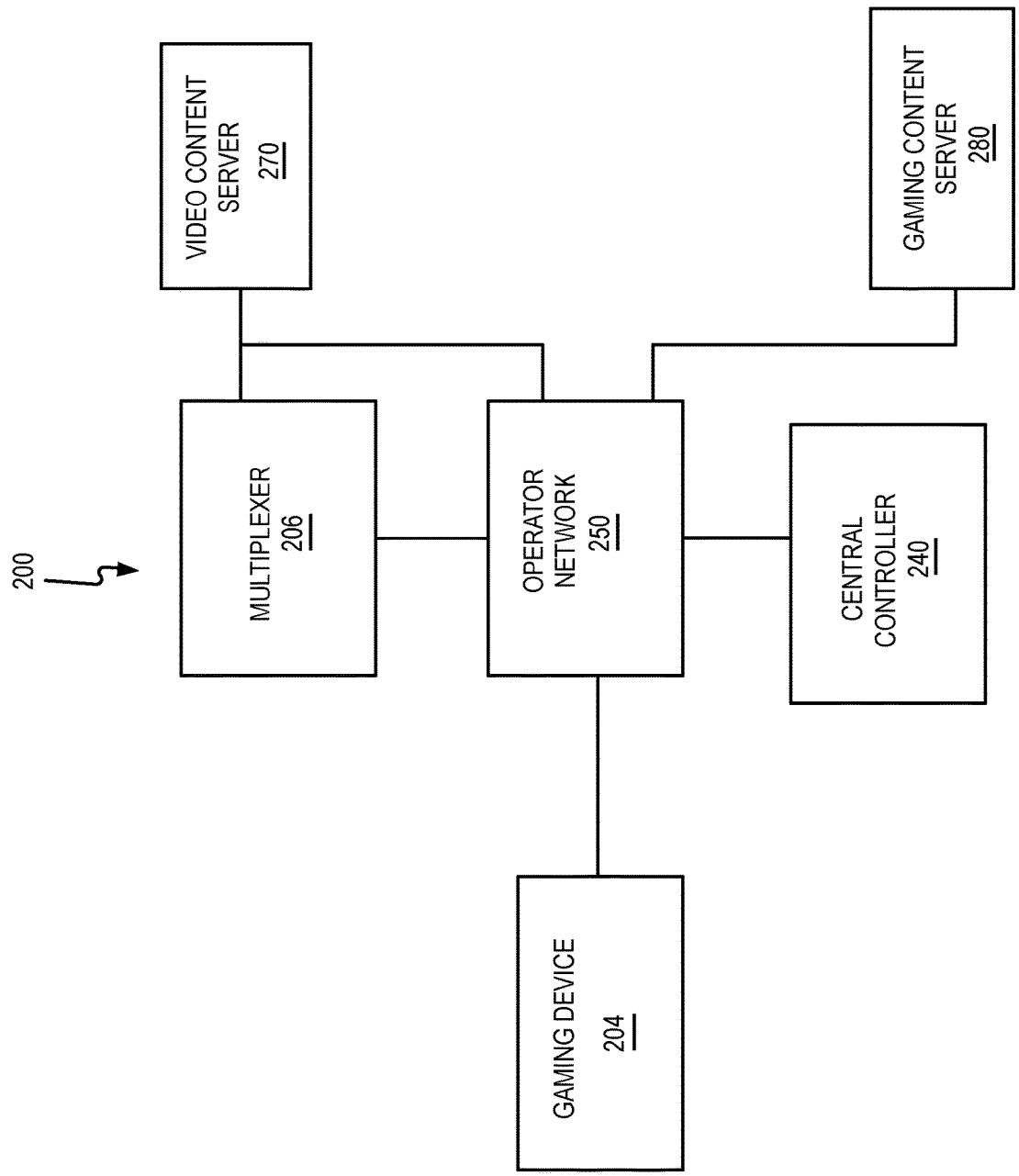
FIG. 2 is a schematic block diagram illustrating a network configuration including a streaming video content server and a gaming content server providing video of a live sporting event and gaming content at one or more gaming devices according to some embodiments.

Referring now to FIG. 2, a schematic block diagram illustrating network configurations for a system 200 including a video content server 270 and a gaming content server 280 is illustrated. The system 200 may include a gaming device 204 and a central controller 240 for providing streaming video content and gaming content to a user via the gaming device 204. In this example, the gaming device 204 is connected to the central controller 240 via an operator network 250 (e.g., an internal casino network), but it should be understood that the central controller 240 in some embodiments may be part of the gaming device 204 or may be connected to the gaming device 204 via a direct wired or wireless connection as well. A video content server 270 and a gaming content server 280 are also connected to the central controller 240 via the operator network 250 in this example.

In the embodiment of FIG. 2, the system 200 may include a multiplexer 206 that receives encrypted video content, such as from the video content server 270 or from outside the operator network 250. In some examples, the multiplexer 206 may be a stand-alone device in the operator network 250 and/or a component of another device, such as the gaming device 204, the central controller 240, the video content server 270, etc. For example, the multiplexer 206 may form a separate local network within the operator network 250 with a plurality of gaming devices 204 (e.g., a local bank of gaming devices). This local network of the multiplexer 206 and gaming devices 204 may be located in a small physical area within the casino, so that the encrypted video signals are decrypted by the multiplexer 206 relatively near to the gaming devices 204 that will display the videos, which adds a layer of security and makes it more difficult for unauthorized persons to access the contents of the decrypted video signals. Additional security measures may include masking the IP ports for the multiplexer 206 in the larger operator network 250 so that the ports of the multiplexer are not visible to all users of the operator network 250.

In some embodiments, the multiplexer 206 may be incorporated into the gaming device 204. One advantage of this arrangement is that the encrypted video signal can be delivered directly to the gaming device 204 and may only be decrypted after the gaming device 204 has received the encrypted video signal. This reduces the danger of unauthorized access to the decrypted video signal. In some embodiments, the multiplexer 206 is external to the gaming devices 204 in the operator network 250. One advantage of these embodiments is that the multiplexer 206 is able to provide video signals to multiple gaming devices 204 simultaneously over the operator network 250. In some embodiments, the multiplexer 206 may re-encrypt the decrypted video signals and deliver the re-encrypted video signals to the individual gaming devices 204. In other embodiments, the multiplexer 206 may decrypt the encrypted video signals and deliver the decrypted video signals to the gaming devices 204 without re-encryption, which have the advantage of reducing the need for additional hardware within each gaming device 204 that may add to the cost of the gaming devices 204.

Figure 3A:
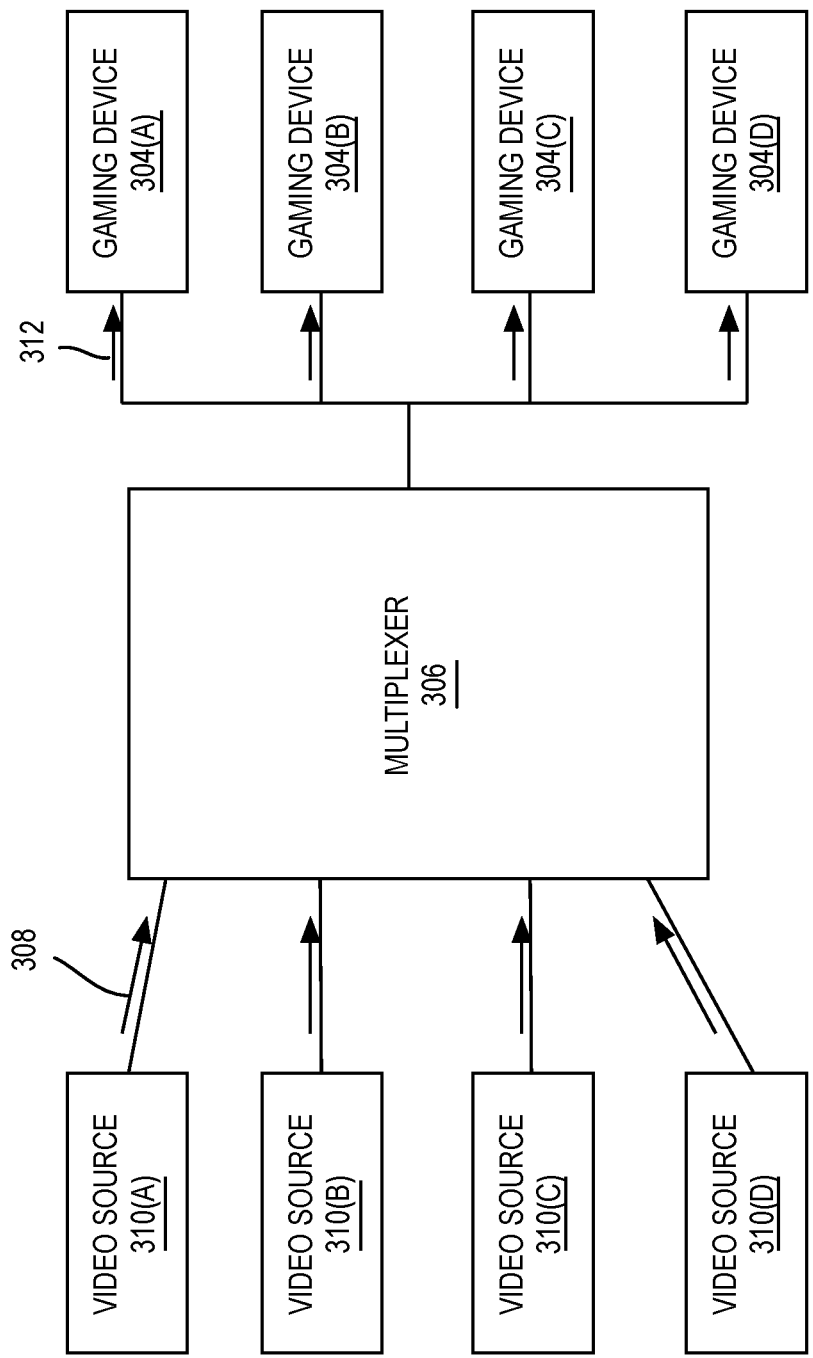
FIGS. 3A and 3B are schematic block diagrams illustrating a network configuration for encoding and selectively providing video of a live sporting event to different gaming devices via a streaming video content server, according to different embodiments.
Figure 3B:
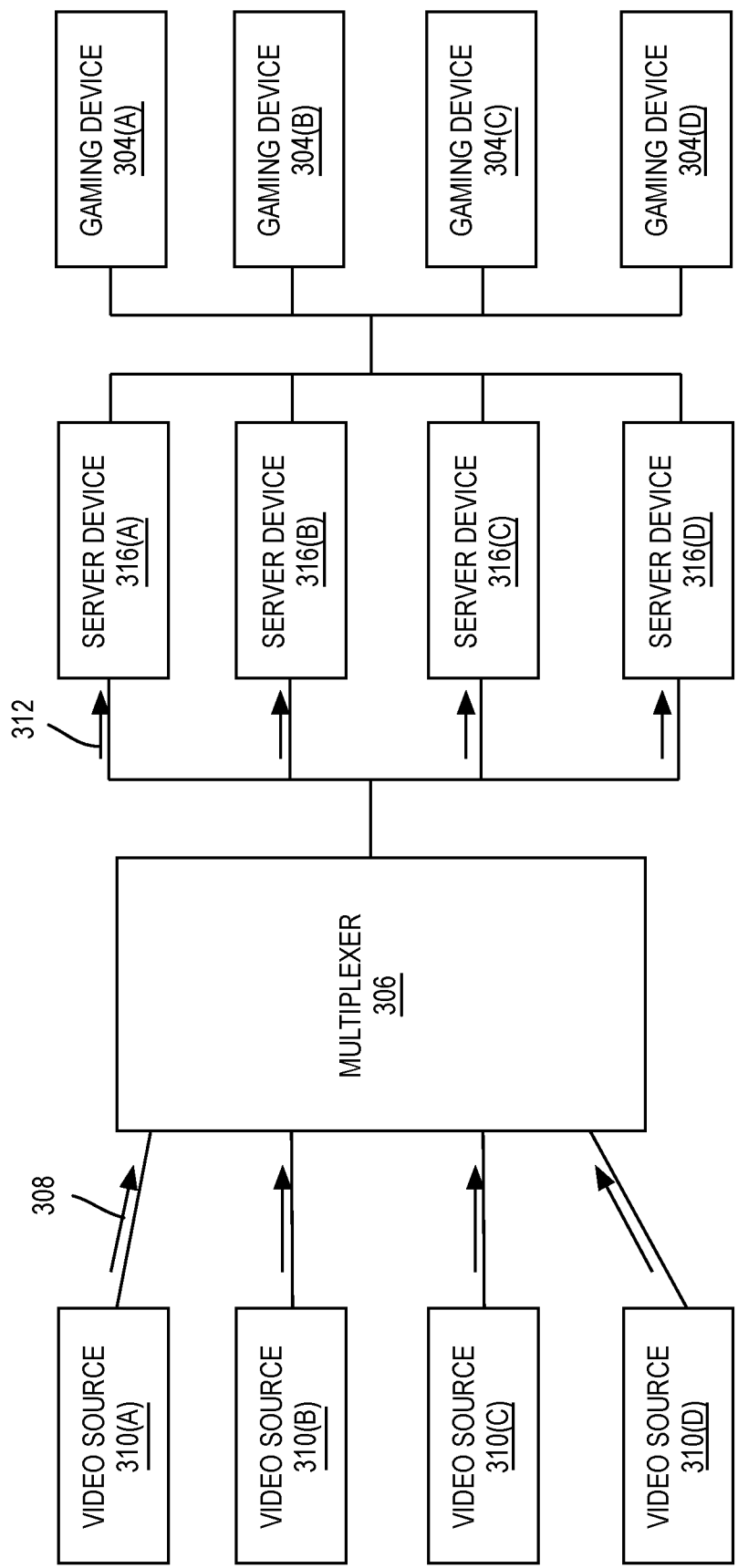

Many hardware and network configurations may be used to implement these and other embodiments. In this regard, FIGS. 3A and 3B are schematic block diagrams illustrating a network configuration for encoding and selectively providing video of a live sporting event to different gaming devices via a streaming video content server, according to different embodiments. In the example of FIG. 3A, a multiplexer 306 may receive a plurality of encrypted video signals 308 from a plurality of video sources 310. In this example, the video sources 310 may include decoder boxes for different video services, e.g., cable, satellite, etc., and may provide the encrypted video signals 308 to the multiplexer via High-Definition Multimedia Interface (HDMI) connections, IP network connections, or other connections, as desired. The encrypted video signals 308 may be encrypted using High-Bandwidth Digital Content Protection (HDCP) or any other suitable encryption technique. The multiplexer 306 may decrypt the encrypted video signals 308 into decrypted video signals that include a plurality of encoded video streams 312 of live sporting events. In some examples, the multiplexer 306 may also encode the decrypted video signals into the plurality of encoded video streams 312, or may re-encode the encoded video streams 312 into a different format. Formats for the encoded video streams 312 may include H.264 or H.265 or other suitable formats. Encoding and decoding may be performed using software and/or hardware encoder/decoders, as desired. In this example, the different encoded video streams 312 are selectively provided to different gaming devices 304, which decode the encoded video streams 312 into decoded video streams that include video of live sporting events at the gaming devices 304, for example. The encoded video streams 312 may be provided to the gaming devices 304 via HDMI connections, IP network connections, or other connections, as desired.

In response to an instruction to display a different video of a different live sporting event at the gaming device 304, the multiplexer may selectively provide a different encoded video stream 312 that includes video to the gaming device 304. The gaming device 304 may then decode the different encoded video stream into a decoded video stream that includes the different video, for display at the gaming device 304.

In the example of FIG. 3A, the gaming devices 304 communicate with the multiplexer 306 over the operator network 350 to selectively receive the different encoded video streams 312, but it should be understood that other arrangements may be used, as desired. For example, referring now to FIG. 3B, the multiplexer 306 may selectively provide different encoded video streams 312 (e.g., different channels) to respective server devices 316, which maintain uniform resource locators (URLs) that can be accessed by the gaming devices 304 over the operator network 350 or another network. In this example, each URL is associated with a unique ethernet address that may be accessed from some or all of the operator network. In some embodiments, a single server device 316 may have a plurality of ethernet addressed hosting a plurality of respective URLs. One advantage of this arrangement is that the multiplexer 306 does not need to dynamically reroute different encoded video streams 312 to different devices in real-time or near-real-time. Instead, in this embodiment, the multiplexer 306 may be configured to deliver the encoded video streams to predetermined locations on the operator network 350, e.g., to a predetermined server device 316. The server device 316 can then communicate with the gaming devices 304 as needed to deliver particular encoded video streams 312 to different gaming devices 304. It should be understood, however, that the multiplexer 306 may be configured to selectively reassign different channels to different server devices 316 and/or URLs as desired.

Figure 4:
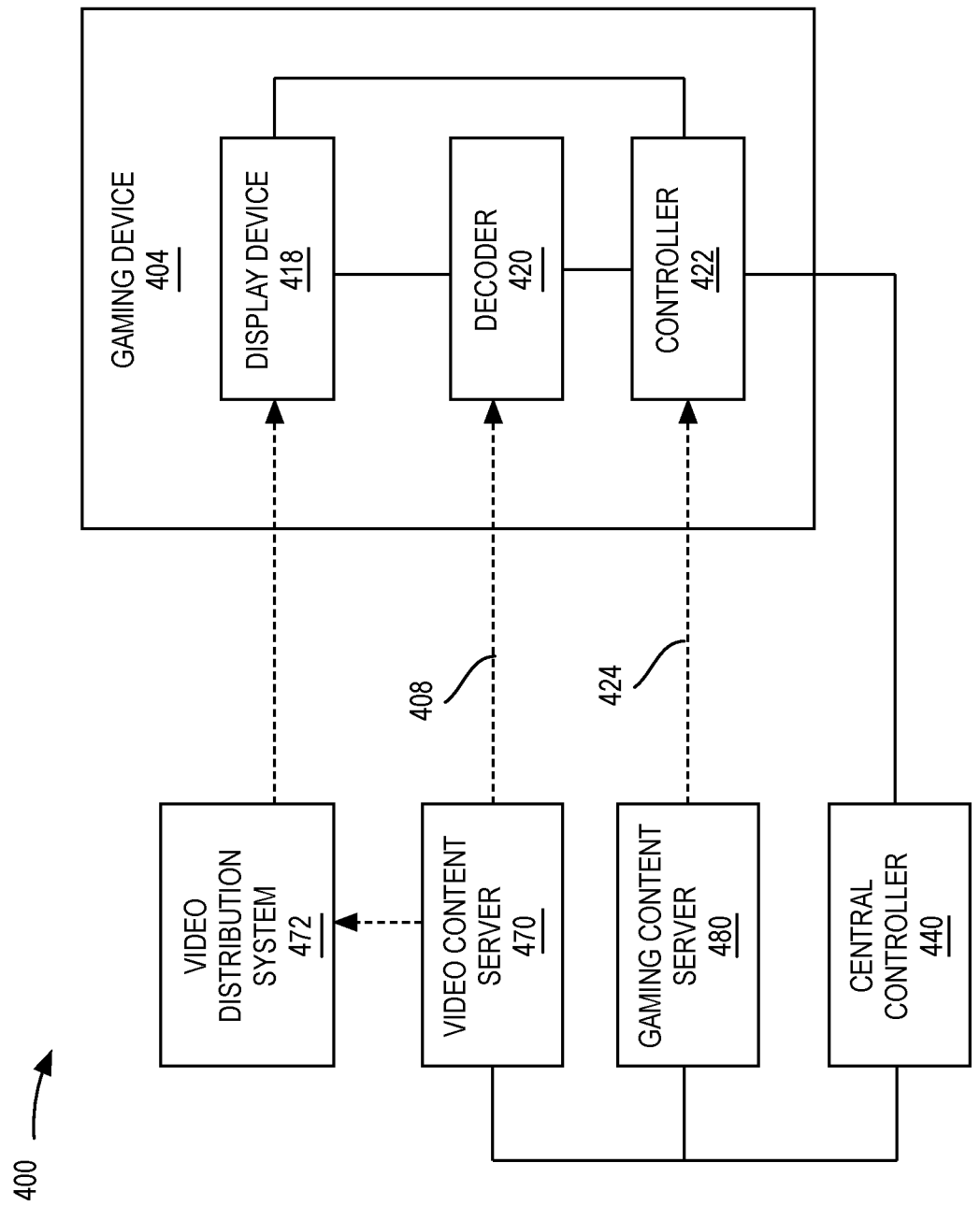
FIG. 4 is a schematic block diagram illustrating a network configuration for providing gaming content and streaming video content to a gaming device, according to another embodiment.

As discussed above, functionality described above may be embodied within gaming device, which may provide additional physical barriers to unauthorized access to the contents of the decrypted video streams. In this regard, FIG. 4 is a schematic block diagram illustrating a system 400 for providing gaming content and streaming video content to a gaming device 404, according to another embodiment.

The gaming device 404 may include a display device 418 coupled to an internal video decoder device 420, which may be a multiplexer, for example, that receives encrypted video signals 408 via an operator network (such as network 50 above) or another network, such as a video distribution network, for example. The gaming device 404 may also include an internal controller 422 that receives gaming content 424 via the operator network or another network, and that communicates with the video decoder device 420 to coordinate providing the gaming content 424 and video content within the encrypted video signals 408 on the display device 418. The central controller 440 may control the video content server 470, the gaming content server 480 and/or the controller 422 of the gaming device 404, to manage distribution of the encrypted video signals 408 and/or gaming content 424 to different gaming devices 404 or channels within the system 400. Alternatively, or in addition, the system 400 may include a dedicated video distribution system 472, which may distribute video independently of the gaming content 424, for example.

Figure 5:
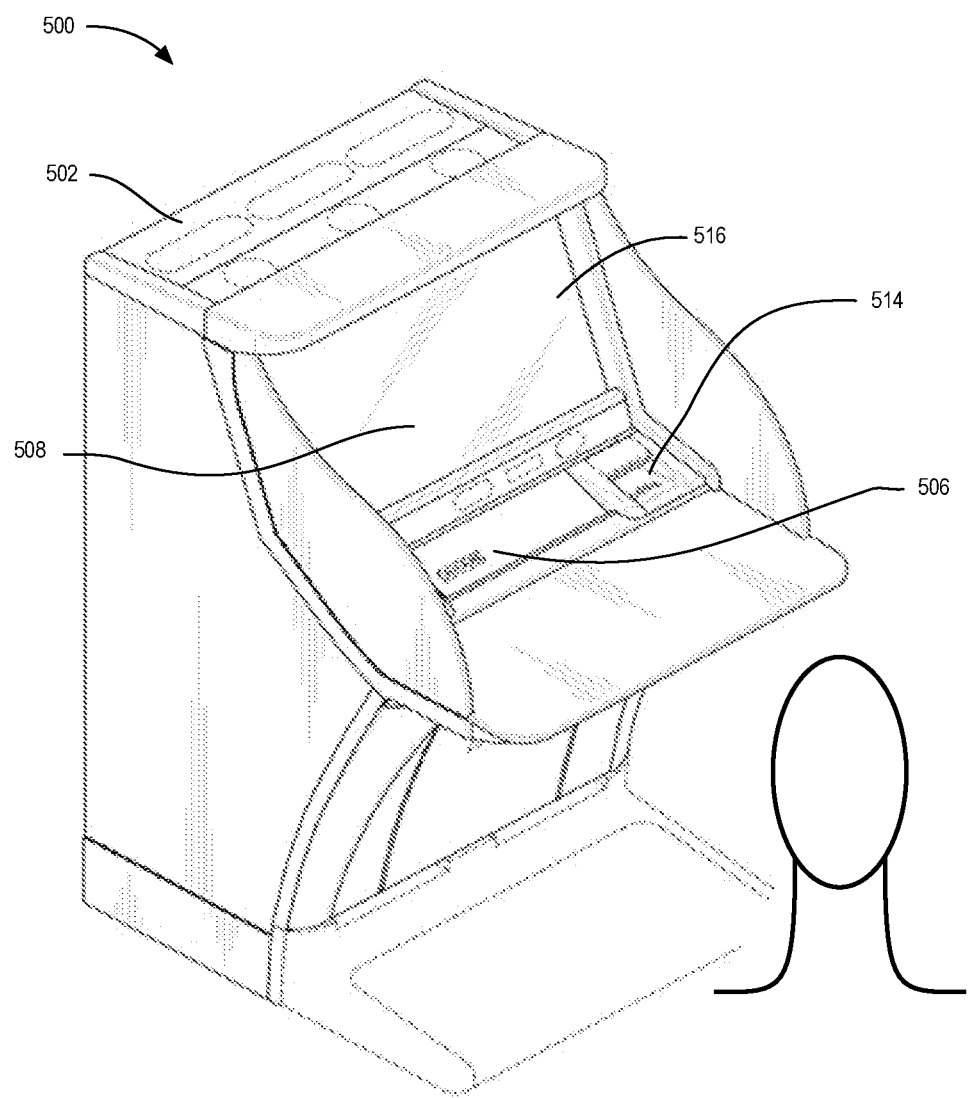
FIG. 5 illustrates a gaming terminal for providing video of a live sporting event and gaming content according to some embodiments.

As used herein, a gaming device may include, for example, an electronic gaming device such as an electronic gaming machine (EGM), gaming terminal, etc., an electro-mechanical gaming device, a computing device such as a personal computer, a mobile computing device such as a tablet, smartphone, etc., or another device or devices. In this regard, FIG. 5 illustrates a dedicated gaming terminal 500 for providing video of a live sporting event and gaming content according to some embodiments. In this embodiment, the gaming terminal 500 includes a housing 502 having a display device 504, and a plurality of input devices 506, such as a keypad, buttons, etc., for receiving user input for playing the wagering game and otherwise interacting with the gaming terminal 500. In some embodiments, the display device 504 may include a touchscreen interface for receiving user input as well. The display device 504 may also be a single display device or may include multiple display devices, such as a first display device for displaying video of the live sporting event and a second display device for displaying gaming and wagering information for example. The gaming terminal 500 may include additional specialized hardware as well, such as an accepto2 512, for receiving currency (e.g., bills and/or coins), tokens, credit or debit cards, or other physical items associated with monetary or other value. The gaming terminal 500 may also include a dispenser 514, for dispensing items, such as physical items having monetary or other value (e.g., awards or prizes) or other items.

As will be discussed in detail below, the gaming terminal 500 may include a processor circuit and a memory coupled to the processor circuit. The memory may include machine-readable instructions that, when executed by the processor circuit, cause the processor circuit to perform operations for operating the gaming terminal 500 and/or other features described herein. In this example, the gaming terminal 500 may include a graphical user interface (GUI) 516 displayed by the display device 504 for providing the video and gaming information to the player.

Figure 6:
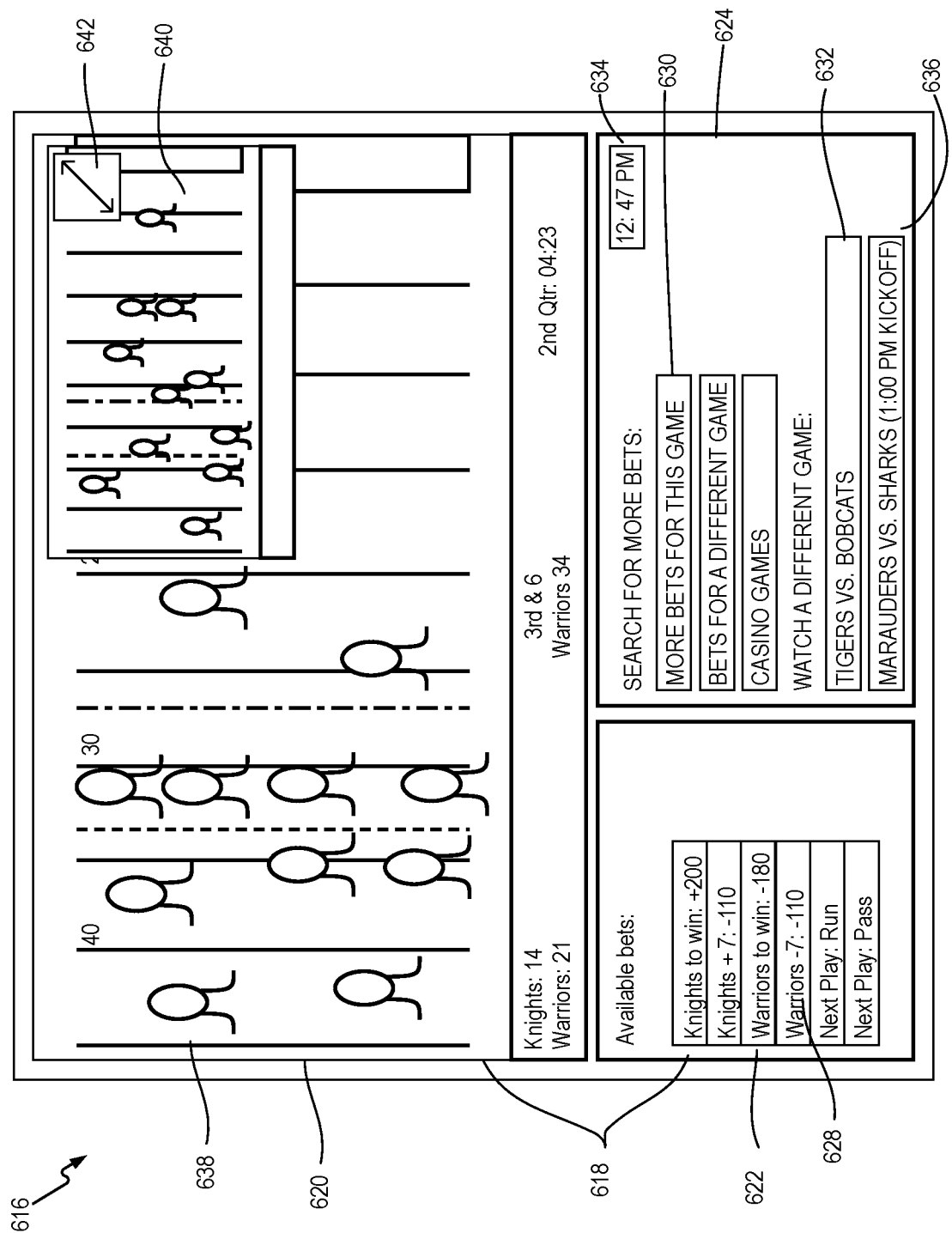
FIG. 6 is a diagram of a graphical user interface for a gaming device including video of a live sporting event and other content displayed on a display of a gaming terminal, according to some embodiments.

In this regard, FIG. 6 is a diagram of a GUI 616 for a gaming device including video of a live sporting event and gaming content displayed on a display of a gaming terminal, according to some embodiments. In this example, as shown by FIG. 6, the GUI 616 is partitioned into different display areas 618, including a live video area 620, a wager selection area 622, and a control interface area 624. It should be understood, however, that additional features may be provided by the GUI 616, such as multiple live video windows, a casino gaming betting interface area, social game interface area, and/or a service window area, for example, as desired.

The live video area 620 may provide video of one or more live sporting events. In some examples, the live video area 620 includes a main video area 638 that is displaying a first live sporting event, and a picture-in-picture (PIP) video area 640 that is displaying a second live sporting event simultaneously. The main video area 638 and the PIP video area 640 may be selectively moveable and/or resizable within the GUI 616, as desired. In this example, the GUI 616 includes a PIP toggle function 642 that moves the first live sporting event to the PIP video area 640 and moves the second live sporting event to the main video area 638. Activating the PIP toggle function 642 again switches the main video area 638 and PIP video area 640 back to their previous configuration.

In some embodiments, the gaming device may be configured to selectively output game audio for one or more of the live sporting events being displayed. This game audio output may be tied to the GUI 616, for example, automatically providing game audio for the sporting event being displayed in the main video area 638 only. The game audio output may also be customized based on user input, such as switching the audio output between the different live sporting events, providing audio output for more than one sporting event simultaneously, or selectively muting the audio output. In some examples, the audio output may be based on detecting characteristics of the player. For example, a camera may track a player's gaze, and determine that the player is viewing a particular live sporting event of a plurality of events that are being displayed on the gaming device. Based on this determination, the gaming device may automatically provide the game audio for the particular live sporting event being viewed, and may also automatically switch to a different game audio for a different live sporting event if the gaming device determines that the player is now viewing the different live sporting event. In some embodiments, the gaming device outputting audio for a first video may receive an instruction to output audio associated with a second video, which may cause the audio device to suspend outputting the audio associated with the first video and selectively output the audio associated with the second video.

The wager selection area 622 may include a plurality of wagers 628, some or all of which may correspond to the live sporting event being displayed in the live video area 620. Alternatively, or in addition, the plurality of wagers 628 may include wagers for other live sporting events. In some embodiments, a player selecting a wager from the plurality of wagers 628 for a different live sporting event may cause the GUI 616 to suspend displaying the current video of the live sporting event and begin displaying video of the different live sporting event.

The control interface area 624 may include a search function 630 that may allow a user to search for particular wagers using a plurality of different criteria, such as additional bets for the current game, bets for a different game, and/or bets for casino games. Additional search criteria may include a type of sport, a particular event, a data, a bet type, or a bet amount, for example. The control interface area 624 may also provide a user with the option 632 to select a different game to watch, and may provide additional information, such as a current time 634 and/or a time at which games are scheduled to begin 636, for example. The wager selection area 622 may also update its display of available bets in real time or near real time as new bets (such as betting on the next play or the next player) or updated bets become available.

It should be appreciated that there are thousands of possible sports wagers at any given time, and that these and other user interfaces may be customized to allow a user to access desired content more quickly and efficiently. For example, a user may scroll through a list of sports, then through a list of games, and then through a list of bets associated with a selected game. Likewise, there may be many live video channels and/or sporting events available, which can be accessed in a similar manner. In some embodiments, a user may select a live video channel and/or sporting event, and the user interface may update based on the selection to present a selection of wagers relating to the sporting event, sport, hometown, player preferences, etc. Conversely, in response to a user selecting a particular wager, the user interface may automatically switch to a channel showing the sporting event associated with the wager, or may filter a display of sporting events relating to the same sport, event type, hometown, etc.

Figure 7A:
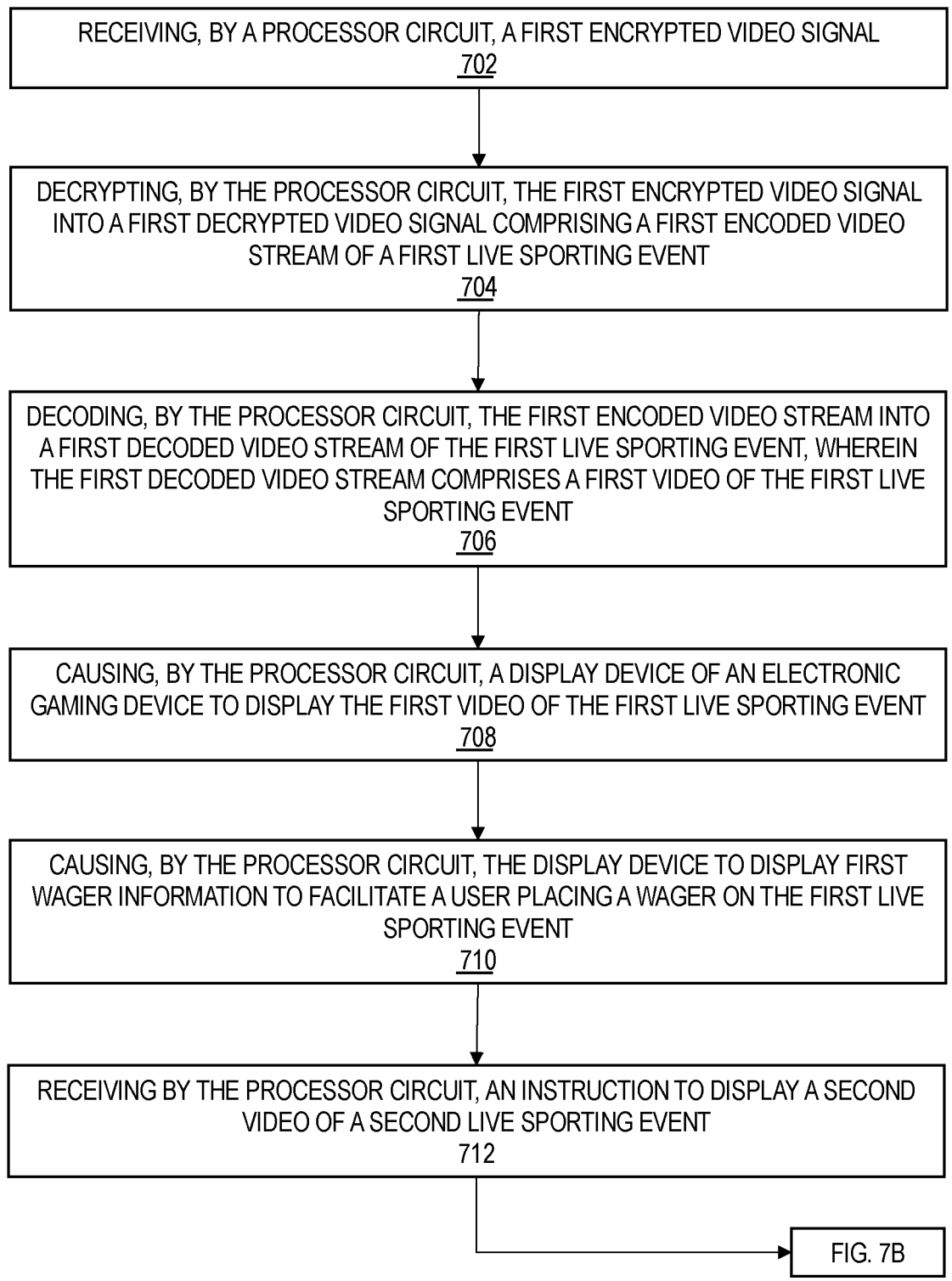

These and other features may be implemented as operations that may be executed by a processor circuit of a computing device. In this regard, FIGS. 7A and 7B are flowcharts illustrating operations 700 of systems/methods according to some embodiments. Referring now to FIG. 7A, operations 700 may include receiving, by a processor circuit, a first encrypted video signal (Block 702). The operations 700 may further include decrypting, by the processor circuit, the first encrypted video signal into a first decrypted video signal comprising a first encoded video stream of a first live sporting event (Block 704). In some embodiments, decrypting the encrypted video signal into the decrypted video signal may include decrypting a first encrypted video signal into a first decrypted video signal comprising a first encoded video stream of the first live sporting event, and decrypting a second encrypted video signal into a second decrypted video signal comprising a second encoded video stream of the second live sporting event. In some embodiments, decrypting the encrypted video signal may include decrypting a single encrypted video signal into one or more decrypted video signals, each including one or more encoded video streams, or decrypting a plurality of encrypted video signals into a single decrypted video signal, as desired.

The operations 700 may further include decoding, by the processor circuit, the first encoded video stream into a first decoded video stream of the first live sporting event, wherein the first decoded video stream comprises a first video of the first live sporting event (Block 706). The operations 700 may further include causing, by the processor circuit, a display device of an electronic gaming device to display the first video of the first live sporting event (Block 708) and display first wager information to facilitate a user placing a wager on the first live sporting event (Block 710). The first wager information may be selected for display based on a first event identifier of the first live sporting event. In some embodiments, the encrypted video signal may be received from a video server device, and a request for the first wager information may be transmitted, based on the first event identifier, to a gaming server device separate from the video server device.

The operations 700 may further include receiving by the processor circuit, an instruction to display a second video of a second live sporting event (Block 712). Referring now to FIG. 7B, the operations 700 may further include receiving, by the processor circuit, a second encrypted video signal (Block 714). The operations 700 may further include decrypting, by the processor circuit, the second encrypted video signal into a second decrypted video signal comprising a second encoded video stream of the second live sporting event (Block 716). In response to receiving the instruction to display the second video of the second live sporting event, the operations 700 may further include, decoding, by the processor circuit, the second encoded video stream into a second decoded video stream of the second live sporting event, wherein the second decoded video stream comprises the second video of the second live sporting event (Block 718). The operations 700 may further include, in response to receiving the instruction to display the second video of the second live sporting event, causing, by the processor circuit, the display device to display the second video of the second live sporting event (Block 720), and display second wager information to facilitate a user placing a wager on the second live sporting event (Block 722). The operations 700 may further include, in response to receiving the instruction to display the second video of the second live sporting event, causing the display device to suspend displaying the first video of the first live sporting event (Block 724), which may include suspending decoding the encoded video stream into the decoded video stream of the first live sporting event, and may also include suspending displaying the first wager information. In some embodiments, the display device may simultaneously display the first video of the first live sporting event and the second video of the second live sporting event, which may include reducing a size of the first video of the first live sporting event on the display. Further, in response to an instruction to enlarge the first video of the first live sporting event, a size of the second video of the second live sporting event on the display may be reduced and the size of the first video of the first live sporting event may be enlarged on the display. The second wager information may be selected for display based on a second event identifier of the second live sporting event. In some embodiments, a request for the second wager information may be transmitted, based on the second event identifier, to a gaming server device separate from the video server device.

In some embodiments, the processor circuit may include a first processor circuit of a server device and a second processor circuit of the electronic gaming device. In some embodiments, receiving the encrypted video signal, decrypting the encrypted video signal, decoding the first encoded video stream, and decoding the second encoded video stream are performed by the second processor circuit, with the first processor circuit performing other operations. For example, the first processor circuit may receive an encrypted source video signal from a source device and decrypt the encrypted source video signal into a decrypted source video signal comprising first encoded source video stream of the first live sporting event and second encoded source video stream of the second live sporting event. The first processor circuit may then generate the decrypted video signal based on the decrypted source video signal, encrypt the decrypted video signal into the encrypted video signal, and transmit the encrypted video signal to the second processor circuit of the electronic gaming device. In some embodiments, generating the decrypted video signal may include decoding the first encoded source video stream into a first decoded source video stream, and generating the first decoded video stream based on the first decoded source video stream. The first decoded video stream may be encoded into the first encoded video stream, and the second encoded source video stream may be decoded into a second decoded source video stream. The second decoded video stream may be generated based on the second decoded source video stream, and may be encoded into the second encoded video stream. In some embodiments, generating the first decoded video stream may include modifying the first decoded source video stream to comprise the first wager information, and generating the second decoded video stream may include modifying the second decoded source video stream to comprise the second wager information.

Figure 8:
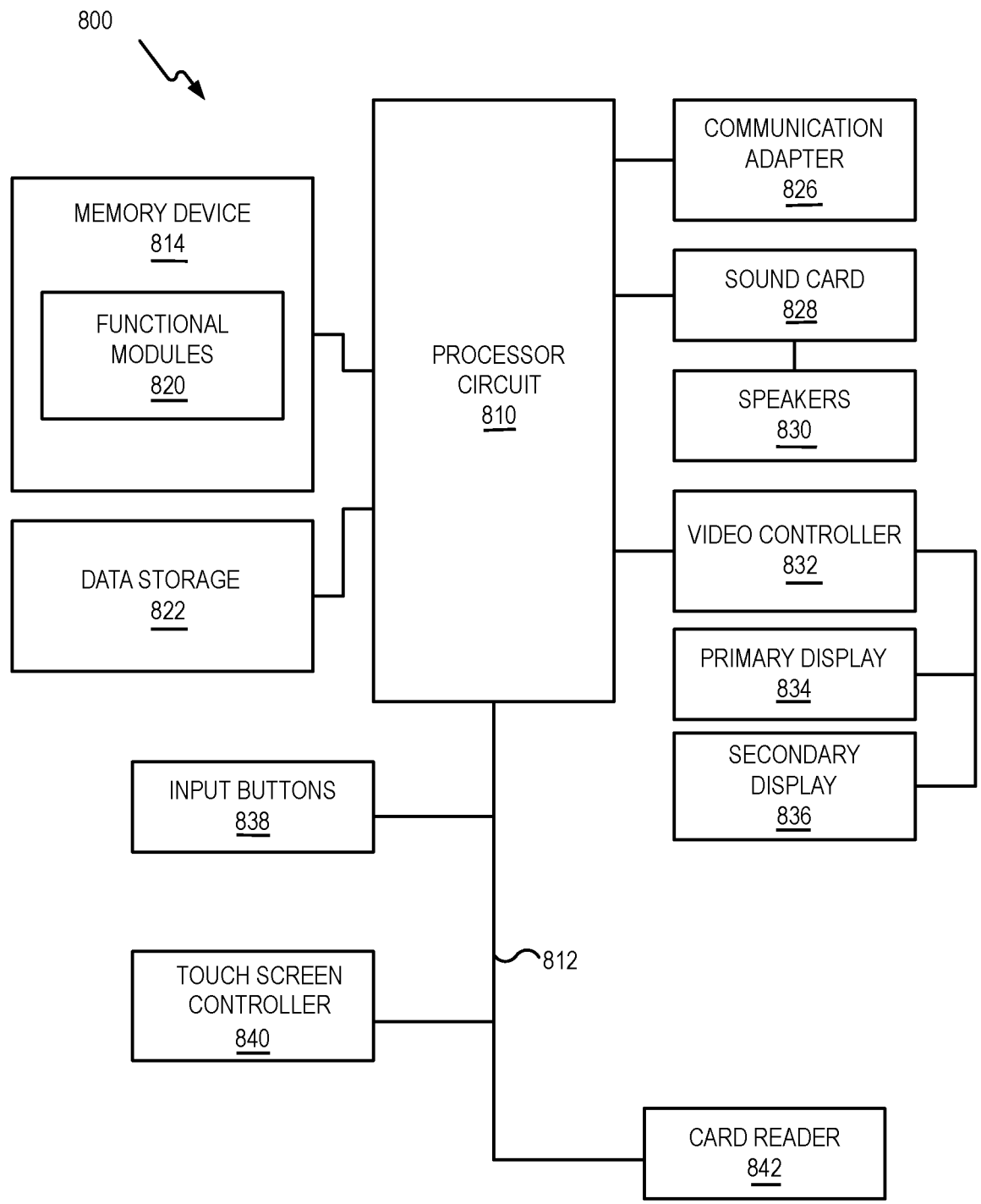
FIG. 8 is a schematic block diagram illustrating various components of a computing device according to some embodiments.

Referring now to FIG. 8, a block diagram that illustrates various components of a computing device 800, which may embody or be included as part of the devices, systems, and/or components above, according to some embodiments. As shown in FIG. 8, the computing device 800 may include a processor circuit 810 that controls operations of the computing device 800. Although illustrated as a single processor, multiple special purpose and/or general-purpose processors and/or processor cores may be provided in the computing device 800. For example, the computing device 800 may include one or more of a video processor, a signal processor, a sound processor and/or a communication controller that performs one or more control functions within the computing device 800. The processor circuit 810 may be variously referred to as a "controller," "microcontroller," "microprocessor" or simply a "computer." The processor circuit 810 may further include one or more application-specific integrated circuits (ASICs).

Various components of the computing device 800 are illustrated in FIG. 9 as being connected to the processor circuit 810. It will be appreciated that the components may be connected to the processor circuit 810 and/or each other through one or more busses 812 including a system bus, a communication bus and controller, such as a USB controller and USB bus, a network interface, or any other suitable type of connection.

The computing device 800 further includes a memory device 814 that stores one or more functional modules 820 for performing the operations described above. Alternatively, or in addition, some of the operations described above may be performed by other devices connected to the network, such as the network 50 of the system 10 of FIG. 1, for example. The computing device 800 may communicate with other devices connected to the network to facilitate performance of some of these operations. For example, the computing device 800 may communicate and coordinate with certain displays to identify elements of a race being displayed by a particular display.

The memory device 814 may store program code and instructions, executable by the processor circuit 810, to control the computing device 800. The memory device 814 may include random access memory (RAM), which can include non-volatile RAM (NVRAM), magnetic RAM (ARAM), ferroelectric RAM (FeRAM) and other forms as commonly understood in the gaming industry. In some embodiments, the memory device 814 may include read only memory (ROM). In some embodiments, the memory device 814 may include flash memory and/or EEPROM (electrically erasable programmable read only memory). Any other suitable magnetic, optical and/or semiconductor memory may operate in conjunction with the gaming device disclosed herein. The computing device 800 may also include a data storage 822 that is separate from the memory 814.

The computing device 800 may include a communication adapter 826 that enables the computing device 800 to communicate with remote devices, such as the wireless network, another computing device 800, and/or a wireless access point, over a wired and/or wireless communication network, such as a local area network (LAN), wide area network (WAN), cellular communication network, or other data communication network, e.g., the network 50 of FIG. 1.

The computing device 800 may include one or more internal or external communication ports that enable the processor circuit 810 to communicate with and to operate with internal or external peripheral devices, such as a sound card 828 and speakers 830, video controllers 832, a primary display 834, a secondary display 836, input buttons 838 or other devices such as switches, keyboards, pointer devices, and/or keypads, a touch screen controller 840, a card reader 842, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 810. Although illustrated as being integrated with the computing device 800, any of the components therein may be external to the computing device 800 and may be communicatively coupled thereto. Although not illustrated, the computing device 800 may further include a rechargeable and/or replaceable power device and/or power connection to a main power supply, such as a building power supply.

In some embodiments, the computing device 800 may include a head mounted device (HMD) and may include optional wearable add-ons that include one or more sensors and/or actuators. Including ones of those discussed herein. The computing device 800 may be a head-mounted mixed-reality device configured to provide mixed reality elements as part of a real-world scene being viewed by the user wearing the computing device 800.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming system comprising:
    a processor circuit; and
    a memory coupled to the processor circuit, the memory comprising machine-readable instructions that, when executed by the processor circuit, cause the processor circuit to:
        decode a first encoded video stream into a first decoded video stream of a first live sporting event, wherein the first decoded video stream comprises a first video of the first live sporting event;
        cause a display device of an electronic gaming device to display the first video of the first live sporting event;
        cause an audio device of the electronic gaming device to selectively output audio associated with the first video;
        receive an instruction to display a second video of a second live sporting event;
        in response to receiving the instruction to display the second video of the second live sporting event, decode a second encoded video stream into a second decoded video stream of a second live sporting event, wherein the second decoded video stream comprises the second video of the second live sporting event; and
        in response to receiving the instruction to display the second video of the second live sporting event, cause the display device to:
            display the second video of the second live sporting event simultaneously with the display of the first video of the first live sporting event;
            cause the audio device to selectively output audio associated with the second video and suspend outputting the audio associated with the first video; and
            display wager information to facilitate a user placing a wager on the second live sporting event.

2. The gaming system of claim 1, wherein the machine-readable instructions further cause the processor circuit to decrypt an encrypted video signal into a decrypted video signal comprising the first encoded video stream and the second encoded video stream.

3. The gaming system of claim 2, wherein the encrypted video signal comprises a first encrypted video signal and a second encrypted video signal,
    wherein the decrypted video signal comprises a first decrypted video signal and a second decrypted video signal, and
    wherein decrypting the encrypted video signal into the decrypted video signal comprises:
        decrypting the first encrypted video signal into the first decrypted video signal, wherein the first decrypted video signal comprises the first encoded video stream of the first live sporting event; and
        decrypting the second encrypted video signal into the second decrypted video signal, wherein the second decrypted video signal comprises the second encoded video stream of the second live sporting event.

4. The gaming system of claim 1, wherein the machine-readable instructions further cause the processor circuit to, in response to receiving the instruction to display the second video of the second live sporting event, cause the display device to suspend displaying the first video of the first live sporting event.

5. The gaming system of claim 4, wherein the machine-readable instructions further cause the processor circuit to, in response to receiving the instruction to display the second video of the second live sporting event, suspend decoding the first encoded video stream into the first decoded video stream of the first live sporting event.

6. The gaming system of claim 1, further comprising the electronic gaming device, the electronic gaming device comprising:
    the display device;
    an input device; and
    a communication interface to communicate with a server device,
    wherein the processor circuit receives the first encoded video stream and the second encoded video stream via the communication interface, and
    wherein the processor circuit receives the instruction to display the second video of the second live sporting event via the input device.

7. The gaming system of claim 1, wherein the wager information comprises second wager information to facilitate the user placing a wager on the second live sporting event, and
    wherein the machine-readable instructions further cause the processor circuit to:
        determine a first event identifier of the first live sporting event;
        select first wager information to facilitate a user placing a wager on the second live sporting event for display based on the first event identifier;
        determine a second event identifier of the second live sporting event; and
        select the second wager information for display based on the second event identifier.

8. The gaming system of claim 7, wherein the machine-readable instructions further cause the processor circuit to:
    receive the a video signal comprising the first encoded video stream and the second encoded video stream from a video server device;
    transmit, based on the first event identifier, a first request for the first wager information to a gaming server device separate from the video server device;
    receive, in response to receiving the first request for the first wager information, the first wager information from the gaming server device;

transmit, based on the second event identifier, a second request for the second wager information to the gaming server device; and receive, in response to receiving the second request for the second wager information, the second wager information from the gaming server device.

9. The gaming system of claim 1, wherein the machine-readable instructions further cause the processor circuit to:
in response to receiving the instruction to display the second video of the second live sporting event, reduce a size of the first video of the first live sporting event on the display.

10. The gaming system of claim 9, wherein the machine-readable instructions further cause the processor circuit to:
in response to an instruction to enlarge the first video of the first live sporting event, reduce a size of the second video of the second live sporting event on the display and increase the size of the first video of the first live sporting event on the display.

11. The gaming system of claim 1, wherein the wager information comprises second wager information to facilitate the user placing a wager on the second live sporting event, and
wherein the instructions further cause the processor circuit to:
display first wager information to facilitate a user placing a wager on the first live sporting event; and
in response to receiving the instruction to display the second video of the second live sporting event, cause the display device to suspend displaying the first wager information.

12. A method comprising:
decrypting, by a processor circuit, an encrypted video signal comprising a first encrypted video signal and a second encrypted video signal into a first decrypted video signal comprising a first encoded video stream and a second decrypted video signal comprising a second encoded video stream;
decoding, by the processor circuit, the first encoded video stream into a first decoded video stream of a first live sporting event, wherein the first decoded video stream comprises a first video of the first live sporting event;
modifying the first decoded video stream to comprise first wager information to facilitate a user placing a wager on the first live sporting event;
causing, by the processor circuit, a display device of an electronic gaming device to:
display the first video of the first live sporting event; and
display the first wager information;
receiving by the processor circuit, an instruction to display a second video of a second live sporting event;
in response to receiving the instruction to display the second video of the second live sporting event, decoding, by the processor circuit, the second encoded video stream into a second decoded video stream of the second live sporting event, wherein the second decoded video stream comprises the second video of the second live sporting event;
modifying the second decoded video stream to comprise second wager information to facilitate a user placing a wager on the first live sporting event;
in response to receiving the instruction to display the second video of the second live sporting event, causing, by the processor circuit, the display device to:
display the second video of the second live sporting event; and
display the second wager information.

13. The method of claim 12, further comprising, in response to receiving the instruction to display the second video of the second live sporting event, causing the display device to suspend displaying the first video of the first live sporting event.

14. The method of claim 12, further comprising, in response to receiving the instruction to display the second video of the second live sporting event, causing, by the processor circuit, the display device to suspend displaying the first wager information.

15. A gaming system comprising:

a processor circuit; and a memory coupled to the processor circuit, the memory comprising machine-readable instructions that, when executed by the processor circuit, cause the processor circuit to:
decrypt an encrypted video signal comprising a first encrypted video signal and a second encrypted video signal, the decryption comprising decryption of the first encrypted video signal into a first decrypted video signal comprising a first encoded video stream and decryption of the second encrypted video signal into a second decrypted video signal comprising a second encoded video stream;
decode the first encoded video stream into a first decoded video stream of a first live sporting event, wherein the first decoded video stream comprises a first video of the first live sporting event;
modify the first decoded video stream to comprise first wager information to facilitate a user placing a wager on the first live sporting event;
cause a display device of an electronic gaming device to:
display the first video of the first live sporting event; and
display the first wager information;
in response to receiving an instruction to display a second video of a second live sporting event, decode the second encoded video stream into a second decoded video stream of the second live sporting event, wherein the second decoded video stream comprises the second video of the second live sporting event;
modify the second decoded video stream to comprise second wager information to facilitate a user placing a wager on the first live sporting event; and
cause the display device to:
display the second video of the second live sporting event; and
display the second wager information.

16. The system of claim 15, wherein the instructions further cause the processor circuit to, in response to receiving the instruction to display the second video of the second live sporting event, cause the display device to suspend displaying the first video of the first live sporting event.

17. The system of claim 15, wherein the instructions further cause the processor circuit to, in response to receiving the instruction to display the second video of the second live sporting event, cause the display device to suspend displaying the first wager information.

* * * * *